United States Patent
Persson et al.

(10) Patent No.: US 10,974,630 B2
(45) Date of Patent: Apr. 13, 2021

(54) ELECTRICAL HEATING ELEMENT

(71) Applicant: Kongsberg Automotive AB, Mullsjö (SE)

(72) Inventors: Mattias Persson, Jönköping (SE); Daniel Josefsson, Falköping (SE)

(73) Assignee: Kongsberg Automotive AB, Mullsjö (SE)

( * ) Notice: Subject to any disclaimer, the term of this patent is extended or adjusted under 35 U.S.C. 154(b) by 254 days.

(21) Appl. No.: 15/738,182

(22) PCT Filed: Jul. 1, 2015

(86) PCT No.: PCT/EP2015/001331
§ 371 (c)(1),
(2) Date: Dec. 20, 2017

(87) PCT Pub. No.: WO2017/000969
PCT Pub. Date: Jan. 5, 2017

(65) Prior Publication Data
US 2018/0186261 A1    Jul. 5, 2018

(51) Int. Cl.
*B60N 2/56* (2006.01)
*H05B 3/56* (2006.01)
*H05B 3/34* (2006.01)

(52) U.S. Cl.
CPC .......... *B60N 2/5685* (2013.01); *H05B 3/34* (2013.01); *H05B 3/56* (2013.01); *H05B 2203/003* (2013.01); *H05B 2203/029* (2013.01)

(58) Field of Classification Search
CPC ..... A47C 7/748; B60N 2/5685; B60N 2/5678
USPC ........................................................ 219/217
See application file for complete search history.

(56) References Cited

U.S. PATENT DOCUMENTS

| | | | |
|---|---|---|---|
| 7,714,256 B2 | 5/2010 | Weiss | |
| 8,106,338 B2 | 1/2012 | Weiss | |
| 8,704,140 B2 | 4/2014 | Kapp et al. | |
| 9,191,997 B2 | 11/2015 | Weiß | |
| 2007/0278210 A1 | 12/2007 | Weiss | |
| 2010/0089894 A1* | 4/2010 | Richmond | H05B 3/34 219/202 |

FOREIGN PATENT DOCUMENTS

| | | |
|---|---|---|
| DE | 102005003946 A1 | 8/2006 |
| EP | 0939579 A1 | 9/1999 |

(Continued)

OTHER PUBLICATIONS

GB 1 284 385 (Year: 1970).*

(Continued)

*Primary Examiner* — Lauren A Crane
(74) *Attorney, Agent, or Firm* — Howard & Howard Attorneys PLLC

(57) ABSTRACT

An electrical heating element (1) comprises a core string (2) and an electrically conductive wire (4), which is wrapped about the core string (2), follows the core string (2) and is electrically insulated with respect to the core string (2). A path (10) defined by the core string (2) includes a sequence of alternating first (11) and second (12) sections, wherein the wire (4) is wrapped in a pitch which, in the first sections (11), is generally smaller than in the second sections (12). The electrical heating element (1) can be used, e.g., in a heatable seat assembly.

18 Claims, 2 Drawing Sheets

(56) References Cited

FOREIGN PATENT DOCUMENTS

Figure 1:
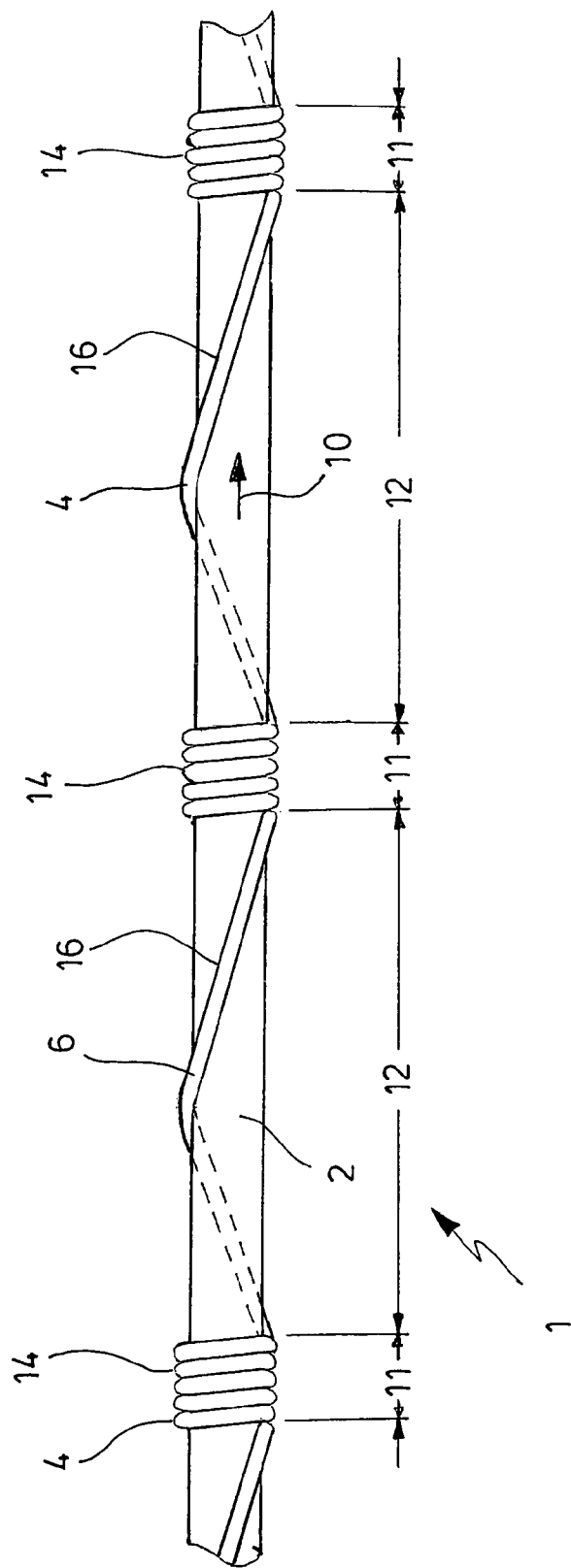

| EP | 1132028 A1 | | 9/2001 | | |
|----|----|----|----|----|----|
| EP | 2575409 A1 | * | 4/2013 | ............... | H05B 3/56 |
| EP | 2575409 A1 | | 4/2013 | | |
| GB | 1284385 A | * | 8/1972 | ............... | H05B 3/56 |
| GB | 1284385 A | | 8/1972 | | |
| GB | 1309515 A | | 3/1973 | | |
| WO | 2013177257 A1 | | 11/2013 | | |
| WO | 2014111740 A1 | | 7/2014 | | |
| WO | 2017000970 A1 | | 1/2017 | | |

OTHER PUBLICATIONS

Translation of EP 2575409 (Year: 2013).*
International Search Report for Application No. PCT/EP2015/001331 dated Mar. 7, 2016, 3 pages.
International Search Report for Application No. PCT/EP2015/001332 dated Mar. 11, 2016, 3 pages.
English language abstract and computer-generated English language translation for DE102005003946A1 extracted from espacenet.com database on Jan. 18, 2018, 9 pages.
English language abstract and computer-generated English language translation for EP0939579A1 extracted from espacenet.com database on Jan. 18, 2018, 7 pages.
English language abstract and computer-generated English language translation for EP2575409A1 extracted from espacenet.com database on Jan. 18, 2018, 9 pages.

* cited by examiner

ELECTRICAL HEATING ELEMENT

The subject application is the National Stage of International Patent Application No. PCT/EP2015/001331, filed on Jul. 1, 2015, the contents of which are incorporated herein by reference in their entirety.

The invention relates to an electrical heating element, which can be used, e.g., in a heating assembly of a seat in a vehicle.

WO 2014/111740 A discloses a seat assembly which comprises a heating element disposed along a predetermined path in a zone of a bottom seating surface or back seating surface. The heating element provides electrical heating of variable temperature along the predetermined path. To this end, the heating element includes first and second sections continuously alternating along the predetermined path. An electrical conductor extending along the whole path forms the only heating resistor in the second sections. In the first sections, additional conductors are arranged in parallel so that the resistance per unit length in the first sections is considerably smaller than that in the second sections. This results in heating temperatures which are greater in the second sections than in the first sections. The second sections form relatively short gaps between the first sections, thus providing a kind of point-like heating effect. Generally, compared to a conventional heating element using a heating wire having a constant resistance per unit length, the power consumption of the heating element described in WO 2014/111740 A is smaller, it heats up more quickly, and its temperature distribution may be regarded as more convenient. A disadvantage, however, is the expenditure in manufacturing, which results in relatively high costs.

The object of the invention is to provide an electrical heating element, in particular for use in a heatable seat assembly, which exhibits a similar "hot point" heating effect, but is less expensive in manufacturing.

This object is achieved by the electrical heating element defined in claim 1. Claim 11 relates to a heating assembly comprising such a heating element. Advantageous versions of the invention follow from the dependent claims.

The electrical heating element according to the invention comprises a core string and an electrically conductive wire, which is wrapped (wound) about the core string, follows the core string and is electrically insulated with respect to the core string. A path defined by the core string includes a sequence of alternating first and second sections. The wire is wrapped in a pitch which, in the first sections, is generally smaller than in the second sections. The wire may be helically wrapped about the core string. The electrical heating element according to the invention can be used, e.g., in a heatable seat assembly.

In the first sections, the number of windings (turns) per unit length measured in the direction of the core string is greater than in the second sections. Thus, a heating current in the wire will result in a power dissipation per unit length measured in the direction of the core string which is greater in the first sections than in the second sections. That means, the electrical heating element according to the invention exhibits the desired "hot point" heating effect and has the advantages of the heating element disclosed in WO 2014/111740 A. On the other hand, manufacture is generally easier and less expensive than that of the prior art heating element.

A smaller pitch corresponds to a greater number of windings per unit length measured in the direction of the core string. The pitch can be expressed as the reciprocal of the number of windings per unit length measured in the direction of the core string.

In the first sections, the wire may have a generally constant first pitch and, in the second sections, the wire may have a generally constant second pitch. In transition regions between the first sections and the second sections, the pitch may vary gradually. The second pitch may be greater than the first pitch by any factor, in particular by a factor in one of the ranges selected from the following list: from 2 to 3, from 3 to 4, from 4 to 6, from 6 to 10, from 10 to 15, from 15 to 20, from 20 to 30, from 30 to 50, from 50 to 100.

A "hot point" heating effect will be achieved if the first sections in the electrical heating element are relatively short, e.g. if they have a length in the range of from 1 mm to 5 mm or from 1 mm to 10 mm or from 1 mm to 15 mm. The second sections have a length greater than the length of the first sections, e.g. a considerably greater length like, e.g., 10 mm, 20 mm or more.

The core string serves as a backbone of the electrical heating element. Generally, it can be made of any material, which is preferably flexible. For example, the core string may be designed as a multifilament (stranded) structure, but if it includes a single rod of a relatively small diameter it will be flexible as well. If the core string comprises a metal, an insulating layer, e.g. applied as an enamel varnish or designed as a plastic sheath, will be advantageous in order to avoid any electrical short with respect to the wire. The core string has to resist the temperatures present in the wire, and the thermal conductivity of the core string should not be too large in order to avoid a deterioration of the "hot point" heating effect.

In advantageous embodiments of the invention, the core string comprises (or even completely consists of) a non-metallic material, e.g. glass fibres, polyamide and/or polycarbonate. The core string may be designed as a multifilament structure, e.g. twisted or braided, or as a single-core structure (monofilament).

The wire, which is wrapped about the core string, should be covered by an insulating layer, e.g. an enamel coating. In that case, it can be tightly wrapped (in principle even in more than one layer) without causing a short. Otherwise, the individual turns of the wire have to be spaced, which does not allow for a very low pitch. The wire can be designed as single wire (monofilament) or as a stranded wire. In the latter case, the stranded wire as a whole may comprise a common insulating layer or each of its individual filaments may be insulated, e.g. with an enamel coating (lacquered filaments or strands).

The wire may comprise a material like a stainless steel, a carbon steel and/or a metal alloy having a high electrical resistivity, as generally known in the art, but the use of other metals, e.g. copper, is conceivable as well. The choice of material depends on design parameters like desired power dissipation per unit length of the core string (in the first sections and in the second sections), number of windings per unit length of the core string (in the first sections and in the second sections), cross-sectional area and length of the wire, supplied voltage, and costs.

One or more than one of the electrical heating elements considered so far may be used for a heating assembly, which further might comprise a temperature controller including at least one temperature sensor and controlling circuitry. In the heating assembly, the electrical heating elements can be of the same type or can be designed differently (e.g. having different total lengths, different lengths of the first and/or second sections, etc.). The heating assembly may further comprise a support structure at which at least one electrical heating element is mounted, for example a support structure for placing an array of heating elements in a two-dimensional manner.

In an application, the heating assembly according to the invention is adapted for fitting in the seat bottom and/or the seat back of a vehicle seat. In this case, the first sections of the at least one electrical heating element (i.e. the "hot points") may be generally evenly distributed over an area of the seat bottom and/or the seat back, but other distributions (preferably as a two-dimensional array) are conceivable as well. Generally, the arrangement of the heating assembly may be similar to that in the seat assembly disclosed in WO 2014/111740 A.

In the following, the invention is further described by means of embodiments. The drawings show in FIG. 1 a schematic representation of an embodiment of an electrical heating element according to the invention and FIG. 2 a perspective view of a vehicle seat having a seat bottom and a seat back including heating assemblies, each comprising an electric heating element according to FIG. 1.

FIG. 1 illustrates, in a schematic manner, an embodiment of an electrical heating element 1. The electrical heating element 1 comprises a core string 2 and an electrically conductive wire 4, which is wrapped (wound) about the core string 2, follows the core string 2 and is electrically insulated with respect to the core string 2.

In the embodiment, the core string 2 is made of a glass fiber monofilament having a diameter in the range of from 0.1 mm to 2.0 mm, which is a generally flexible material. Other structures, dimensions or materials are possible as well, e.g. braided or twisted multifilament structures, which generally increases flexibility, or plastic materials. Glass fibers have the advantage of a high thermal stability. Plastic materials like polycarbonate or polyamides can also be suitable at the elevated temperatures present when the electrical heating element 1 is used.

In the embodiment, the wire 4 is covered by an insulating layer 6 of enamel varnish, which avoids any electrical shorts when the wire 4 is wrapped about the core string 2. The wire 4 is electrically conductive, but it may be advantageous if its conductivity is relatively low, depending on the dimensions of the wire 4, the voltage applied to the wire 4 and the desired temperature distribution along the wire 4. Suitable alloys may be carbon steels, stainless steels or high-resistivity alloys, as well known in the art. Generally, however, any metal may be used, for example copper.

Figure 2:
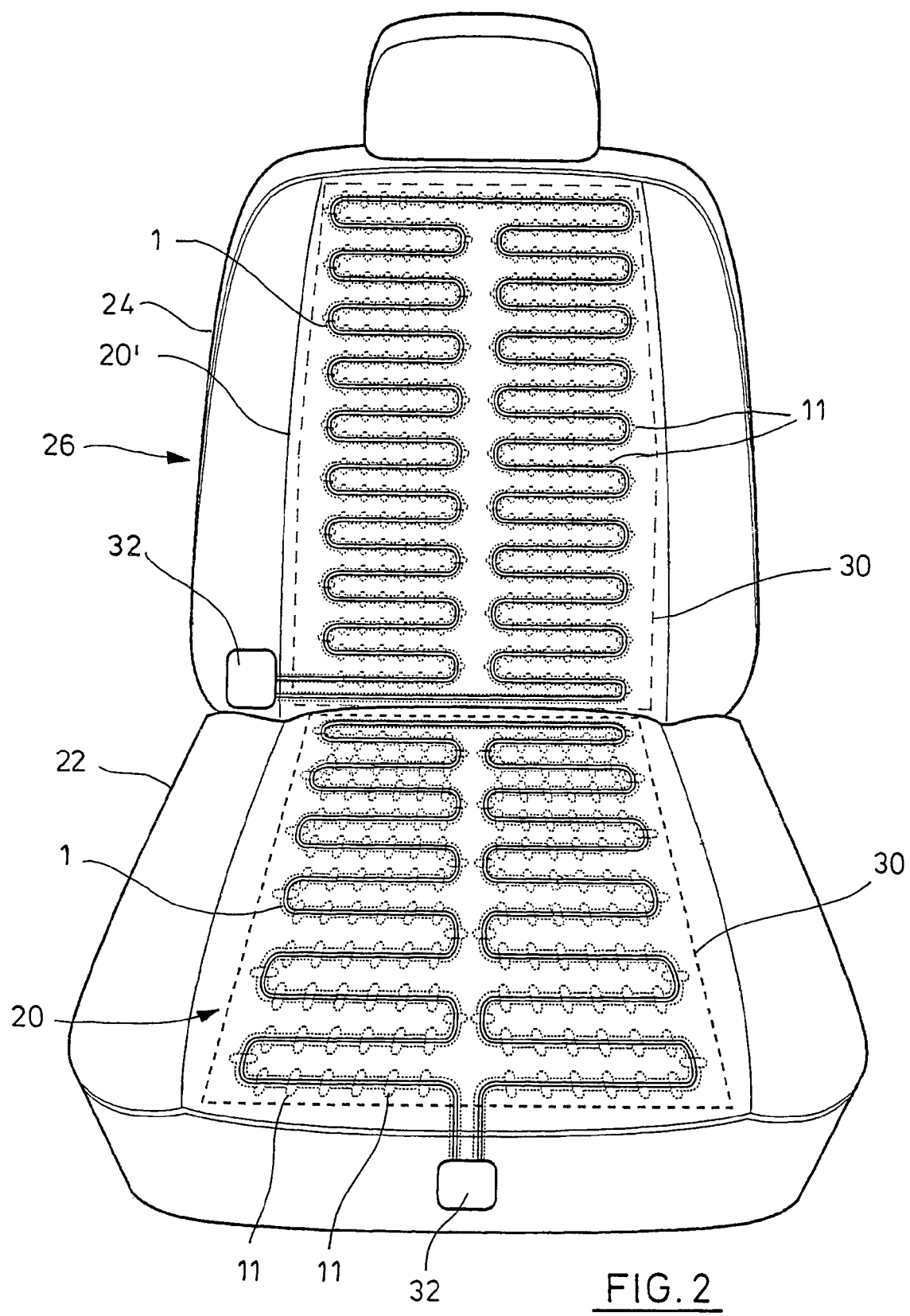

The core string 2 defines a path 10, as indicated in FIG. 1 by a short arrow. FIG. 1 displays only a relatively short section of the electrical heating element 1. Generally, the electrical heating element 1 is flexible and can be arranged in multiple ways. FIG. 2 illustrates a meandering arrangement, as explained further below in detail.

The path 10 defined by the core string 2 includes a sequence of alternating first sections 11 and second sections 12, see FIG. 1. In the first sections 11, the wire 4 is more tightly wrapped than in the second sections 12. Thus, the pitch of the windings is smaller in the first sections 11 than in the second sections 12. In other words, the number of windings 14 of the wire 4 per unit length measured in the direction of the core string 2 (i.e. along the path 10) is greater in the first sections 11 than in the second sections 12. In the embodiment displayed in FIG. 1, there are five windings 14 in the relatively short first sections 11, and there is just one winding 16 in each of the relatively long second sections 12. In FIG. 1, the part of the winding 16 not directly visible is schematically indicated in dashed lines. Depending on the application, the number of windings in the respective first sections 11 and the length of the respective second sections 12 may be non-constant, in contrast to the embodiment shown in FIG. 1.

When an electrical current passes the wire 4, electrical power is dissipated, depending on the current and the dimensions and electrical resistivity of the wire 4. Since the local concentration of the wire 4 is greater in the first sections 11 than in the second sections 12, the power dissipation per unit length measured in the direction of the core string 2 (i.e. along the path 10) is greater in the first sections 11 than in the second sections 12. This results in a temperature distribution having peaks in the first sections 11. Thus, the electrical heating element exhibits a "hot point" heating effect.

FIG. 2 illustrates an application of the electrical heating element 1 according to FIG. 1. In FIG. 2, the electrical heating element 1 is part of a heating assembly 20 and a very similar heating assembly 20' used for electrically heating a seat bottom 22 and a seat back 24, respectively, of a vehicle seat 26, e.g. in an automotive.

The heating assembly 20 comprises one electrical heating element 1, which emerges from a position at the front of the vehicle seat 26, loops back and forth in a meander-like pattern on one half of the seat bottom 22 and returns to the front of the vehicle seat 26 on the other half of the seat bottom 22 in a mirror-like path. In FIG. 2, the respective first sections 11 are schematically indicated by small ellipses.

In the embodiment, the electrical heating element 1 is fixed to a textile support 30, symbolized in FIG. 2 by dashed lines. The support 30 facilitates the manufacture of the heating assemblage 20 and its assembly in the seat bottom 22.

The electrical heating element 1 starts from and returns to a power connection 32, as indicated in FIG. 2. The heating assembly 20 further comprises a controller, which may be mounted in a box at the power connection 32 or elsewhere, and one or more than one temperature sensors. When the heating assembly 20 is operated, the temperature is higher in the "hot points" determined by the first sections 11 of the electrical heating element 1. In the embodiment of FIG. 2, these "hot points" are essentially evenly distributed, but other arrangements are possible as well.

The heating assembly 20' in the seat back 24 is very similar to the heating assembly 20. Therefore, for corresponding parts of both heating assemblies 20, 20', the same reference numerals are used.

The invention claimed is:

1. An electrical heating element for use in a heatable seat assembly, comprising:
   a core string defining a path; and
   an electrically conductive wire wrapped about and following the core string and electrically insulated with respect to the core string, the electrically conductive wire including a sequence of alternating first and second sections along the path defined by the core string with the first and second sections spaced from each other along the path such that the electrically conductive wire does not overlap itself along the first section and the second section,
   wherein the electrically conductive wire is wrapped in multiple windings in a first pitch in each of the first sections and is wrapped in a single winding at a second pitch in each of the second sections with the first pitch being smaller than the second pitch.

2. The electrical heating element of claim 1, wherein the electrically conductive wire is helically wrapped about the core string.

3. The electrical heating element of claim 2, wherein the first pitch of the electrically conductive wire is generally constant in the first sections, and the second pitch of the electrically conductive wire is generally constant in the second sections.

4. The electrical heating element of claim 3, wherein the second pitch is greater than the first pitch by a factor of one of from 2 to 3, from 3 to 4, from 4 to 6, from 6 to 10, from 10 to 15, from 15 to 20, from 20 to 30, from 30 to 50, and from 50 to 100.

5. The electrical heating element of claim 1, wherein each of the first sections has a length of from 1 mm to 15 mm, and each of the second sections has a length greater than the length of each of the first sections.

6. The electrical heating element of claim 1, wherein the core string comprises a non-conductive material.

7. The electrical heating element of claim 6, wherein the core string comprises at least one material selected from glass fibres, polyamides, and polycarbonate.

8. The electrical heating element of claim 1, wherein the electrically conductive wire is covered by an insulating layer.

9. The electrical heating element of claim 1, wherein the electrically conductive wire is designed as a stranded wire comprising a plurality of filaments.

10. The electrical heating element of claim 1, wherein the electrically conductive wire comprises at least one material selected from stainless steels, carbon steels, high-resistivity metal alloys, and metals.

11. A heating assembly comprising:
a support structure; and
a least one electrical heating element mounted to the support structure with the at least one electrical heating element comprising:
a core string defining a path; and
an electrically conductive wire wrapped about and following the core string, and electrically insulated with respect to the core string, the electrically conductive wire including a sequence of alternating first and second sections along the path defined by the core string with the first and second sections spaced from each other along the path such that the electrically conductive wire does not overlap itself along the first section and the second section,
wherein the electrically conductive wire is wrapped in multiple windings in a first pitch in each of the first sections and is wrapped in a single winding at a second pitch in each of the second sections with the first pitch being smaller than the second pitch.

12. The heating assembly of claim 11, further comprising a temperature controller.

13. The heating assembly of claim 11, wherein the heating assembly is adapted for fitting in at least one of a seat bottom and a seat back of a vehicle seat.

14. The heating assembly of claim 13, wherein the first sections of the at least one electrical heating element are generally evenly distributed over an area of at least one of the seat bottom and the seat back.

15. The electrical heating element of claim 9 wherein each filament is covered by an insulating coating.

16. The electrical heating element of claim 10 wherein the electrically conductive wire comprises copper.

17. The electrical heating element of claim 1, wherein the electrically conductive wire is covered with an enamel coating.

18. The heating assembly of claim 11, wherein the electrically conductive wire is covered with an enamel coating.

\* \* \* \* \*